(12) United States Patent
Wood et al.

(10) Patent No.: US 12,381,246 B2
(45) Date of Patent: Aug. 5, 2025

(54) REDOX MITIGATING SOLID OXIDE CELL COMPOSITIONS

(71) Applicant: VERSA POWER SYSTEMS, LTD, Danbury, CT (US)

(72) Inventors: Anthony Wood, Calgary (CA); Tahir Joia, Calgary (CA)

(73) Assignee: VERSA POWER SYSTEMS, LTD, Danbury, CT (US)

( * ) Notice: Subject to any disclaimer, the term of this patent is extended or adjusted under 35 U.S.C. 154(b) by 712 days.

(21) Appl. No.: 17/184,172

(22) Filed: Feb. 24, 2021

(65) Prior Publication Data

US 2021/0257642 A1 Aug. 19, 2021

Related U.S. Application Data

(63) Continuation of application No. PCT/IB2019/057627, filed on Sep. 10, 2019.
(Continued)

(51) Int. Cl.
| | |
|---|---|
| *H01M 8/1213* | (2016.01) |
| *H01M 4/90* | (2006.01) |
| *H01M 8/1246* | (2016.01) |
| *C25B 9/23* | (2021.01) |
| *C25B 11/032* | (2021.01) |
| *C25B 13/07* | (2021.01) |
| *H01M 4/86* | (2006.01) |
| *H01M 8/12* | (2016.01) |

(52) U.S. Cl.
CPC ....... *H01M 8/1213* (2013.01); *H01M 4/9025* (2013.01); *H01M 4/9066* (2013.01); *H01M 8/1246* (2013.01); *C25B 9/23* (2021.01); *C25B 11/032* (2021.01); *C25B 13/07* (2021.01); *H01M 4/8657* (2013.01); *H01M 2008/1293* (2013.01)

(58) Field of Classification Search
CPC ............. H01M 8/1213; H01M 4/9025; H01M 4/9066; H01M 8/1246; H01M 2008/1293
See application file for complete search history.

(56) References Cited

U.S. PATENT DOCUMENTS

| 8,617,763 B2 | 12/2013 | Armstrong et al. |
| 2002/0155335 A1 | 10/2002 | Kearl |
| (Continued) | | |

FOREIGN PATENT DOCUMENTS

| CN | 1610985 A | 4/2005 |
| EP | 2 851 985 A1 | 3/2015 |
| (Continued) | | |

OTHER PUBLICATIONS

Machine translation of JP09082335A. Obtained from PE2E search (Year: 1997).*

(Continued)

*Primary Examiner* — Laura Weiner (74) *Attorney, Agent, or Firm* — Foley & Lardner LLP (57) ABSTRACT

The present technology is directed to a solid oxide cell that may be used as a solid oxide fuel cell or a solid oxide electrolyser cell. The solid oxide cell is configured to avoid deformation caused by differential shrinking via incorporation of an oxygen barrier layer which mitigates the damage caused by the introduction of an oxidizing environment in the anode cavity during the operation of the solid oxide cell as a solid oxide fuel cell.

13 Claims, 5 Drawing Sheets

Related U.S. Application Data (60) Provisional application No. 62/729,633, filed on Sep. 11, 2018.

(56) References Cited

U.S. PATENT DOCUMENTS

| | | | |
|---|---|---|---|
| 2006/0024547 A1 | 2/2006 | Waldbillig et al. | |
| 2007/0015045 A1* | 1/2007 | Lee | H01M 4/8652 429/496 |
| 2012/0186976 A1* | 7/2012 | Laucournet | H01M 8/0243 204/252 |
| 2015/0093680 A1* | 4/2015 | Day | H01M 8/124 502/1 |
| 2016/0333476 A1* | 11/2016 | Öunpuu | H01M 8/1226 |
| 2017/0170485 A1 | 6/2017 | Huang et al. | |

FOREIGN PATENT DOCUMENTS

| | | | | |
|---|---|---|---|---|
| JP | 09082335 A | * | 3/1997 | Y02E 60/50 |
| KR | 20150018500 A | | 2/2015 | |
| WO | WO-02/087002 A1 | | 10/2002 | |
| WO | WO-2006/010260 A1 | | 2/2006 | |
| WO | WO-2011/019825 A2 | | 2/2011 | |

OTHER PUBLICATIONS

Notification of Preliminary Rejection in KR Appl. No. 10-2021-7008568, dated Dec. 22, 2022 (with English translation).

Second Office Action in CN Appl. No. 201980059479.7, dated Nov. 15, 2022 (with English translation).

International Search Report and Written Opinion in PCT/IB2019/057627 dated Jul. 16, 2020.

Wood A, Pastula M, Waldbillig D, Ivey D., *Initial testing of solutions to redox problems with anode-supported solid oxide fuel cells (SOFC)*, Proceedings of SOFC-IX, Quebec, Canada, Electrochemical Society Proceedings, 2005, p. 571-583.

Wood A, Pastula M, Waldbillig D, Ivey DG., *Initial testing of solutions to redox problems with anode-supported SOFC*, J Electrochem Soc, 2006, 153(10), A1929-A1934.

Extended European Search Report in EP19861186 dated May 11, 2022.

* cited by examiner

REDOX MITIGATING SOLID OXIDE CELL COMPOSITIONS

CROSS-REFERENCE TO RELATED APPLICATIONS

This application is a continuation of International Application No. PCT/IB2019/057627, filed Sep. 10, 2019, which claims priority to and the benefit of U.S. Patent App. No. 62/729,633, filed Sep. 11, 2018, the entire disclosure of which is incorporated by reference herein in its entirety.

STATEMENT OF U.S. GOVERNMENT RIGHTS

This invention was made with government support under DE-FE0027584 awarded by the United States Department of Energy. The government has certain rights in the invention.

BACKGROUND

The present technology generally relates to anode-supported solid oxide cells, such as solid oxide fuel cells (SOFCs) and solid oxide electrolyser cells (SOECs), having a porous cermet oxidation barrier layer. For ease of reference in the present disclosure and the claims, the description of components (e.g., cathode, anode) is recited in reference to use of the solid oxide cell as a SOFC, understanding the solid oxide cells of the present technology may be used as SOFCs as well as SOECs.

Solid oxide fuel cells (SOFCs) are an energy generation technology that produce electricity quietly, cleanly, and efficiently through the direct electrochemical combination of a fuel with an oxidant. This direct production of electricity effectively bypasses the conversion of the fuel's chemical energy into thermal and mechanical energy and thus allows higher theoretical efficiencies to be achieved. The reactants (fuel and oxidant) are supplied to the cell through manifolds and flow fields that direct the reactants to the appropriate sides of a solid ceramic membrane that acts as an electrolyte. The membrane is coated with electrodes on both sides and permits transfer of ions of the oxidant, but does not permit transfer of electrons. Thus the streams of reactants are kept separate, but the electrons and ions from the reactants are allowed to react. Electrons are emitted at the fuel side electrode of the solid electrolyte membrane and absorbed at the oxygen side electrode thereby generating a potential difference between the two electrodes. The solid electrolyte membrane separates the reactants, transfers the charge in the form of ions, and, at the same time, prevents an electron short circuit between the two electrodes of the solid electrolyte. For this purpose, the solid electrolyte membrane has a low electronic conductivity while at the same time having a high ionic conductivity.

A typical planar SOFC may be anode supported where the electrolyte and cathode are thin layers applied to a structural anode substrate. Because SOFCs are made of a number of distinct layers (anode substrate, anode functional layer, electrolyte, cathode functional layer) made of differing materials that are co-fired together, each of these layers will shrink differently during co-firing. This differential shrinkage causes the cell to deflect or deform after co-firing. The deformation typically results in a domed shaped cell. One approach is to reduce cell curvature through high temperature ironing. However, ironing is a separate high temperature firing step that uses up resources and takes time. Furthermore, each high temperature firing step coarsens the fuel cell microstructure slightly, which may degrade its performance.

In anode supported planar solid oxide fuel cell (SOFC) construction, a typical anode is commonly made from a cermet mixture of nickel and yttria-stabilized zirconia (YSZ). In a reducing atmosphere at the anode, nickel oxide will not form provided that the fuel supply is maintained and the voltage stays above the thermodynamic equilibrium potential of nickel and nickel oxide. If the fuel supply is cut off, such as may occur during emergency shutdown of an SOFC system, air can leak into the anode cavity, which causes rapid oxidation of the anode. This is undesirable since there is a volume expansion when nickel oxidizes that can potentially damage the structure of the cell by causing layer delamination or electrolyte cracking. If the electrolyte cracks, the fuel and oxidant gases will be able to mix directly, with potentially catastrophic results.

In International Patent Application Publ. WO 01/43524, an anode stress compensation layer is provided which is essentially a dense layer of zirconia. In order to allow fuel to pass through and contact the anode, large openings in the stress compensation layer are provided. Because of the size of the openings, there may be difficulties with non-uniform gas distribution and anode contact.

International Patent Application Publ. WO 04/006365 attempts to address the shortcomings in this approach by providing a stress compensation layer of zirconium oxide, which is described as continuous but which defines a plurality of small openings in a regular pattern, such as a hexagonal pattern, in order to allow the passage of the fuel gas. An electron-conducting layer such as a porous nickel/nickel oxide is then applied over the stress compensation layer. This latter solution requires four distinct anode layers: an anode functional layer, an anode support, the stress compensation layer and an electron-conducting layer. As a result, this fuel cell is more complex than desired and requires many more steps to construct than is optimum. As well, the small openings in the YSZ stress compensation layer may excessively limit the amount of fuel that can flow through this layer, which may cause mass transport losses to occur at higher current density of the operating conditions.

Therefore, there is a need in the art for a fuel cell which is configured to avoid deformation caused by differential shrinkage and which mitigates the difficulties of the prior art. Furthermore, there is a need in the art to mitigate the damage caused by the introduction of an oxidizing environment in the anode cavity during operation of the fuel cell.

SUMMARY

According to an exemplary embodiment, a solid oxide cell includes a porous solid cathode layer including a first cathode surface and a second cathode surface. The cell also includes a solid electrolyte layer that includes a first electrolyte surface and a second electrolyte surface, where the first electrolyte surface is disposed toward the second cathode surface. The cell further includes a porous cermet anode functional layer (AFL) that includes a first AFL surface and a second AFL surface, with the first AFL surface contacting the second electrolyte surface. The cell further includes a porous cermet anode substrate (AS) comprising a first AS surface and a second AS surface, with the first AS surface contacting the second AFL surface. The cell further includes a porous cermet oxidation barrier layer (OBL) comprising a first OBL surface and a second OBL surface, with the first OBL surface contacting the second AS surface. The OBL comprises yttria-stabilized zirconia and about 35 vol. % to about 70 vol. % of transition metals selected from nickel and one or both of cobalt and iron.

DETAILED DESCRIPTION

According to an exemplary embodiment, a solid oxide cell is provided that may be used as a SOFC or a SOEC, where the solid oxide cell includes (wherein, for ease of reference, it is to be understood that the following recitation of terms is in reference to use of the solid oxide cell as a SOFC): a porous solid cathode layer including a first cathode surface, and a second cathode surface; a solid electrolyte layer including a first electrolyte surface disposed toward the second cathode surface, and a second electrolyte surface; a porous solid anode functional layer (AFL) including a first AFL surface contacting the second electrolyte surface, and a second AFL surface; a porous solid anode substrate (AS) including a first AS surface contacting the second AFL surface and a second AS surface; and a porous cermet oxidation barrier layer (OBL) including a first OBL surface contacting the second AS surface, and a second OBL surface; wherein the OBL includes yttria-stabilized zirconia and about 35 vol. % to about 70 vol. % of transition metals selected from nickel and one or both of cobalt and iron.

A person of ordinary skill in the art would understand that when used as an SOEC, the porous solid cathode layer would be a porous solid anode layer, the porous solid anode functional layer would be a porous solid cathode functional layer, and the like.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As will be understood by one skilled in the art, for any and all purposes, particularly in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

The term "cermet" will be understood by persons of ordinary skill in the art and may vary to some extent depending upon the context in which it is used. If there are uses of the term which are not clear to persons of ordinary skill in the art, given the context in which it is used, the term refers to a mixture of a ceramic material and a metallic material that has been sintered to form a solid body.

The term "porosity" as used will be understood by persons of ordinary skill in the art and may vary to some extent depending upon the context in which it is used. If there are uses of the term which are not clear to persons of ordinary skill in the art, given the context in which it is used, the term refers to the void volume of a material. Void volume may be determined by a variety of methods, including, but not limited to, ASTM CCA11916, ASTM D6761-07, ASTM D5965-02, or ASTM C604-02.

The present technology is directed at a solid oxide cell configured to minimize deformation caused by differential shrinkage during co-firing and to provide an oxidation barrier. The solid oxide cell of the present technology may be utilized as a SOFC or as a solid oxide electrolyser cell (SOEC). For ease of reference in the present disclosure and in the claims, the description of components (e.g., cathode, anode) is recited in relation to use of the solid oxide cell as a SOFC, understanding the solid oxide cells of the present technology may be used as SOFCs as well as SOECs. A person of ordinary skill in the art would understand that when used as an SOEC, the porous solid cathode layer would be a porous solid anode layer, the porous solid anode functional layer would be a porous solid cathode functional layer, and the like.

Thus, in an aspect, a solid oxide cell is provided that may be used as a SOFC or a SOEC, where the solid oxide cell includes:

a porous solid cathode layer including a first cathode surface, and a second cathode surface;

a solid electrolyte layer including a first electrolyte surface disposed toward the second cathode surface, and a second electrolyte surface;

a porous solid anode functional layer (AFL) including a first AFL surface contacting the second electrolyte surface, and a second AFL surface; a porous solid anode substrate (AS) including a first AS surface contacting the second AFL surface and a second AS surface; and a porous cermet oxidation barrier layer (OBL) including a first OBL surface contacting the second AS surface, and a second OBL surface;

wherein the OBL includes yttria-stabilized zirconia and about 35 vol. % to about 70 vol. % of transition metals selected from nickel and one or both of cobalt and iron.

The OBL may include about 65 vol. % to about 30 vol. % yttria-stabilized zirconia. When discussing "vol. %" of the metals and/or yttria-stabilized zirconia, it is to be understood as in reference to the components of the OBL in the reduced state (i.e., fuel present when used as a SOFC) and does not take into consideration void volume of the OBL. The yttria-stabilized zirconia of any embodiment herein may include about 3 mole % to about 10 mole % yttria. Therefore, in any embodiment herein, the yttria-stabilized zirconia may include yttria at about 3 mole %, about 4 mole %, about 5 mole %, about 6 mole %, about 7 mole %, about 8 mole %, about 9 mole %, about 10 mole %, or any range or value, including and/or in between any two of these values.

As discussed above, the OBL includes about 35 vol. % to about 70 vol. % of transition metals selected from nickel and one or both of cobalt and iron. Thus, the total amount of such metals in the OBL may be about 35 vol. %, about 36 vol. %, about 37 vol. %, about 38 vol. %, about 39 vol. %, about 40 vol. %, about 42 vol. %, about 44 vol. %, about 46 vol. %, about 48 vol. %, about 50 vol. %, about 52 vol. %, about 54 vol. %, about 56 vol. %, about 58 vol. %, about 60 vol. %, about 61 vol. %, about 62 vol. %, about 63 vol. %, about 64 vol. %, about 65 vol. %, about 66 vol. %, about 67 vol. %, about 68 vol. %, about 69 vol. %, about 70 vol. %, or any range or value, including and/or in between any two of these values. In any embodiment herein, the OBL may include yttria-stabilized zirconia in an amount of about 65 vol. %, about 64 vol. %, about 63 vol. %, about 62 vol. %, about 61 vol. %, about 60 vol. %, about 58 vol. %, about 56 vol. %, about 54 vol. %, about 52 vol. %, about 50 vol. %, about 49 vol. %, about 48 vol. %, about 47 vol. %, about 46 vol. %, about 45 vol. %, about 44 vol. %, about 43 vol. %, about 42 vol. %, about 41 vol. %, about 40 vol. %, about 39 vol. %, about 38 vol. %, about 37 vol. %, about 36 vol. %, about 35 vol. %, or any range or value, including and/or in between any two of these values. The components of the OBL may be present as particles with a number-average diameter (D50) of about 0.1 µm to about 1.5 µm, such as about 0.2 µm to about 0.9 µm.

In the solid oxide cell of the present technology, there may be a ratio of nickel to cobalt, nickel to iron, or nickel to cobalt and iron from about 1:5 to about 15:1. Hereafter, such as in the claims, it is to be understood that the use of the phrase "ratio of nickel to cobalt and iron" means a ratio of nickel to cobalt when iron is not present, a ratio of nickel to iron when cobalt is not present, or a ratio of nickel to the combination of cobalt and iron when both cobalt and iron are present, where such ratios are determined on an elemental basis. Thus, the ratio of ratio of nickel to cobalt and iron may be about 1:5, about 1:4, about 1:3, about 1:2, about 1:1, about 2:1, about 3:1, about 4:1, about 5:1, about 6:1, about 7:1, about 8:1, about 9:1, about 10:1, about 11:1, about 12:1, about 13:1, about 14:1, about 15:1, or any range or value, including and/or in between any two of these values.

The OBL may be from about 1 µm to about 50 µm thick, where such thickness is the average distance between the first OBL surface and the second OBL surface. The OBL may have a thickness of about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, about 15 µm, about 16 µm, about 17 µm, about 18 µm, about 19 µm, about 20 µm, about 21 µm, about 22 µm, about 23 µm, about 24 µm, about 25 µm, about 26 µm, about 27 µm, about 28 µm, about 29 µm, about 30 µm, about 31 µm, about 32 µm, about 33 µm, about 34 µm, about 35 µm, about 36 µm, about 37 µm, about 38 µm, about 39 µm, about 40 µm, about 41 µm, about 42 µm, about 43 µm, about 44 µm, about 45 µm, about 46 µm, about 47 µm, about 48 µm, about 49 µm, about 50 µm, or any range or value, including and/or in between any two of these values. For example, the OBL of any embodiment herein may be about 3 µm to about 30 µm thick.

In any embodiment herein, it may be that the OBL does not include copper. In any embodiment herein, it may be that the OBL does not include manganese. In any embodiment herein, it may be that the OBL does not include silver. In any embodiment herein, it may be that the OBL does not include palladium. In any embodiment herein, it may be that the OBL does not include transition metals other than nickel and one or both of cobalt and iron.

As discussed above, the OBL is porous. The OBL as-fabricated may have a porosity or about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, or any range or value, including and/or in between any two of these values. The OBL, when reduced, may have a porosity or about 10% to about 50%. Thus, the OBL when reduced may have a porosity of about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, or any range or value, including and/or in between any two of these values. Typically, the OBL when reduced has a number-average pore size that is significantly smaller than a number-average pore size of the AS.

Figure 1:
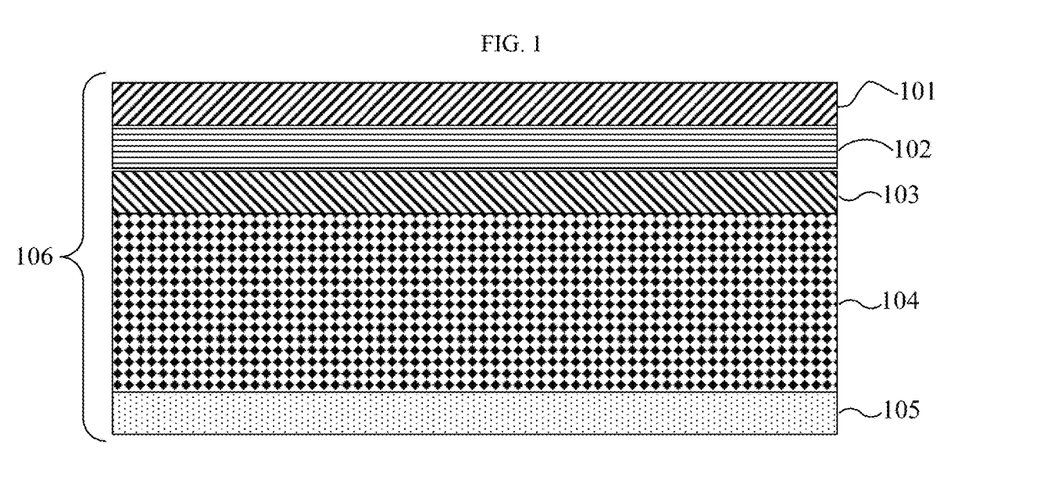
FIG. 1 provides a schematic representation of certain embodiments of a solid oxide cell of the present technology.

FIG. 1 is provided as a non-limiting illustration of a solid oxide cell of the present technology where, in this embodiment, the cell does not include a cathode barrier layer (discussed herein). The anode-supported solid oxide cell 106 includes the AS 104, the AFL 103, and the solid electrolyte layer 102. The porous solid cathode layer 101 is provided on the opposite side of the solid electrolyte layer 102 in relation to the AFL 103. An OBL 105 is included on the AS 104 opposite the AFL 103.

Without being bound by theory, because the OBL is significantly less porous than the AS and generally has a much finer microstructure, it is believed the OBL densifies rapidly upon oxidation because as the metallic component oxidizes, it will expand and fill the pore volume. Co and Fe each oxidize more rapidly than nickel and tend to form a chemical compound with a spinel structure when re-oxidized at SOFC operating temperatures, allowing controlled oxidation and densification of the OBL without cracking. In addition, the use of Co and or Fe leads to lower density (i.e., higher gas permeability) when the solid oxide cell is in operation in the reduced metallic cermet state and higher density (i.e., more effective oxidation barrier layer) when the metallic components of the OBL are oxidized. As a result, the OBL acts as a gas barrier in oxidizing conditions. As may be appreciated, there will be a minimum porosity required in order to ensure that mass transport losses induced as a result of fuel flow constriction during operation are minimized. However, the less porous the OBL or the higher the content of metal component present, the better the OBL will perform as both an oxygen barrier and as a structural stabilizing layer during co-firing of the solid oxide cell. It is believed that a porosity of less than about 50% for the OBL in a reduced state is a suitable compromise. When oxidized, the OBLs porosity may be reduced to about 25% or less, such as to about 15% or less.

Manufacture of any one or more layer of the solid oxide cell (e.g., the porous solid cathode layer, solid electrolyte layer, OBL, AFL, and AS) may be realized via screen printing according to techniques well-known to those of ordinary skill in the art or may be deposited using any other deposition technique such as tape casting, chemical vapour deposition (CVD), physical vapour deposition (PVD), plasma spraying, dip coating, and the like. By way of example, the OBL may be deposited with the metal part of the cermet in the form of an oxide (e.g., nickel oxide) which will later be converted to a metal upon reduction (e.g., nickel oxide reduced to nickel metal). By printing the cermet particles of the OBL, the OBL may experience shrinkage during firing of the solid oxide cell substantially equivalent to that of the other solid oxide cell layers. As a result, the solid oxide cell may remain relatively flat, within stack assembly tolerances, without the need for a separate ironing or flattening step.

In any embodiment herein, the solid oxide cell may further include a cathode barrier layer (CBL) disposed between the cathode second surface and the first electrolyte surface. In such embodiments, a first surface of the CBL may contact the cathode second surface and a second surface of the CBL may contact the first electrolyte surface. The CBL may include a dense ceria or a porous ceria. The dense ceria may be undoped or doped. The porous ceria may be undoped or doped. Exemplary doped ceria include $(Ce_{0.9}Gd_{0.1})O_{2-\delta}$ and $(Ce_{0.9}Sm_{0.1})O_{2-\delta}$. The CBL may be about 1 μm to about 10 μm thick (i.e., the average thickness between the first surface and the second surface of the CBL). Thus, the average thickness of the CBL of any embodiment herein may be about 1 μm, about 2 μm, about 3 μm, about 4 μm, about 5 μm, about 6 μm, about 7 μm, about 8 μm, about 9 μm, about 10 μm, or any range or value, including and/or in between any two of these values. When the solid oxide cell does not include a CBL, the cathode second surface may contact the first electrolyte surface.

The porous solid cathode layer of the solid oxide cell may include lanthanum strontium manganese (LSM; e.g., $La_xSr_{1-x}MnO_{3-\delta}$), lanthanum strontium cobalt (LSC; e.g., $La_xSr_{1-x}CoO_{3-\delta}$), lanthanum strontium cobalt ferrite (LSCF; e.g., $La_xSr_{1-x}Co_yFe_{1-y}O_{3-\delta}$), strontium samarium cobaltite (SSC, e.g., $Sr_xSm_{2-x}CoO_{3-\delta}$) and barium strontium cobalt iron oxide (BSCF; e.g., $Ba_xSr_{1-x}Co_yFe_{1-y}O_{3-\delta}$) or any other SOFC cathode material described in the art. The porous solid cathode layer may be from about 5 μm to about 50 μm thick, where such thickness is the average distance between the first cathode surface and the second cathode surface. The porous solid cathode layer may have a thickness of about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, about 50 μm, or any range or value, including and/or in between any two of these values. In any embodiment herein, the porous solid cathode layer may have a porosity of about 5% to about 50%; thus, the porosity of the porous solid cathode layer may be about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, or any range or value, including and/or in between any two of these values.

The solid electrolyte layer, in contrast to the other layers of the solid oxide cell, may have a limited amount of porosity, preferably no more than about 5% by volume, so that gas cannot flow through the solid electrolyte layer; ideally, the solid electrolyte layer has at least no open porosity or is fully dense. The solid electrolyte layer may include a yttria-stabilized zirconia of any embodiment herein, a scandia-stabilized zirconia (ScSZ), a Gd-doped ceria (e.g., $(Ce_{0.9}Gd_{0.1})O_{2-\delta}$), a Sm-doped ceria (e.g., $(Ce_{0.9}Sm_{0.1})O_{2-\delta}$), a strontium and magnesium doped lanthanum gallate (LSGM; e.g., $La_{1-x}Sr_xGa_{1-y}Mg_yO_{3-\delta}$), and/or any other ionically conducting material. The solid electrolyte layer is generally manufactured to be as thin as possible in order to minimize resistive losses, but its average thickness may be about 1 μm to about 20 μm in order to ensure that it has no connected porosity which would allow fuel and oxidant gases to mix. The thickness of the solid electrolyte layer of any embodiment herein may be about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, or any range or value, including and/or in between any two of these values.

The AFL may include a cermet of one or more transition metals and yttria-stabilized zirconia. Exemplary transition metals include, but are not limited to, nickel, iron, cobalt, or a mixture of any two or more thereof. The AFL may have a porosity (when reduced) from about 10% to about 50% to about, preferably from about 15% to about 40%. Therefore, in any embodiment herein, the AFL may have a porosity of about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, or any range or value, including and/or in between any two of these values. The average thickness of the AFL of any embodiment herein may be about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, or any range or value, including and/or in between any two of these values.

The AS may include a cermet of one or more transition metals and yttria-stabilized zirconia. Exemplary transition metals include, but are not limited to, nickel, iron, cobalt, or a mixture of any two or more thereof. The AS may have a porosity (when reduced) from about 25% to about 60%; thus, the AS of any embodiment herein may have a porosity (when reduced) of about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, or any range or value, including and/or in between any two of these values. The average thickness of the AS of any embodiment herein may be about 200 μm, about 250 μm, about 300 μm, about 350 μm, about 400 μm, about 450 μm, about 500 μm, about 600 μm, about 700 μm, about 800 μm, about 900 μm, about 1 mm (i.e., about 1000 μm), about 1.1 mm, about 1.2 mm, about 1.3 mm, about 1.4 mm, about 1.5 mm, or any range or value, including and/or in between any two of these values.

EXAMPLES

The examples herein are provided to illustrate advantages of the present technology and to further assist a person of ordinary skill in the art with preparing or using the processes of the present technology. The examples herein are also presented in order to more fully illustrate the preferred aspects of the present technology. The examples should in no way be construed as limiting the scope of the present technology. The examples can include or incorporate any of the variations, embodiments, or aspects of the present technology described above. The variations, embodiments, or aspects described above may also further each include or incorporate the variations of any or all other variations, embodiments, or aspects of the present technology.

Two SOFC cells were generated, one according to the present technology including an OBL 8 μm-10 μm and a counterpart identical in construction except for the omission of the OBL. Table 1 provides the composition of the initial components used to provide the OBL ("OBL #1") in terms of mass %. Binder, solvent, dispersant and other organic materials are added to this mixture to prepare the screen printing ink and the organic materials are subsequently removed during a sintering step. As illustrated in Table 2, the Ni:Co ratio of OBL #1 is 9:1 on an elemental basis.

TABLE 1

| Component | Mass % |
|---|---|
| NiO | 51.1 |
| 8 mole % yttria-stabilized zirconia (8-YSZ) | 52.8 |
| $Co_3O_4$ | 6.1 |

Figure 2:
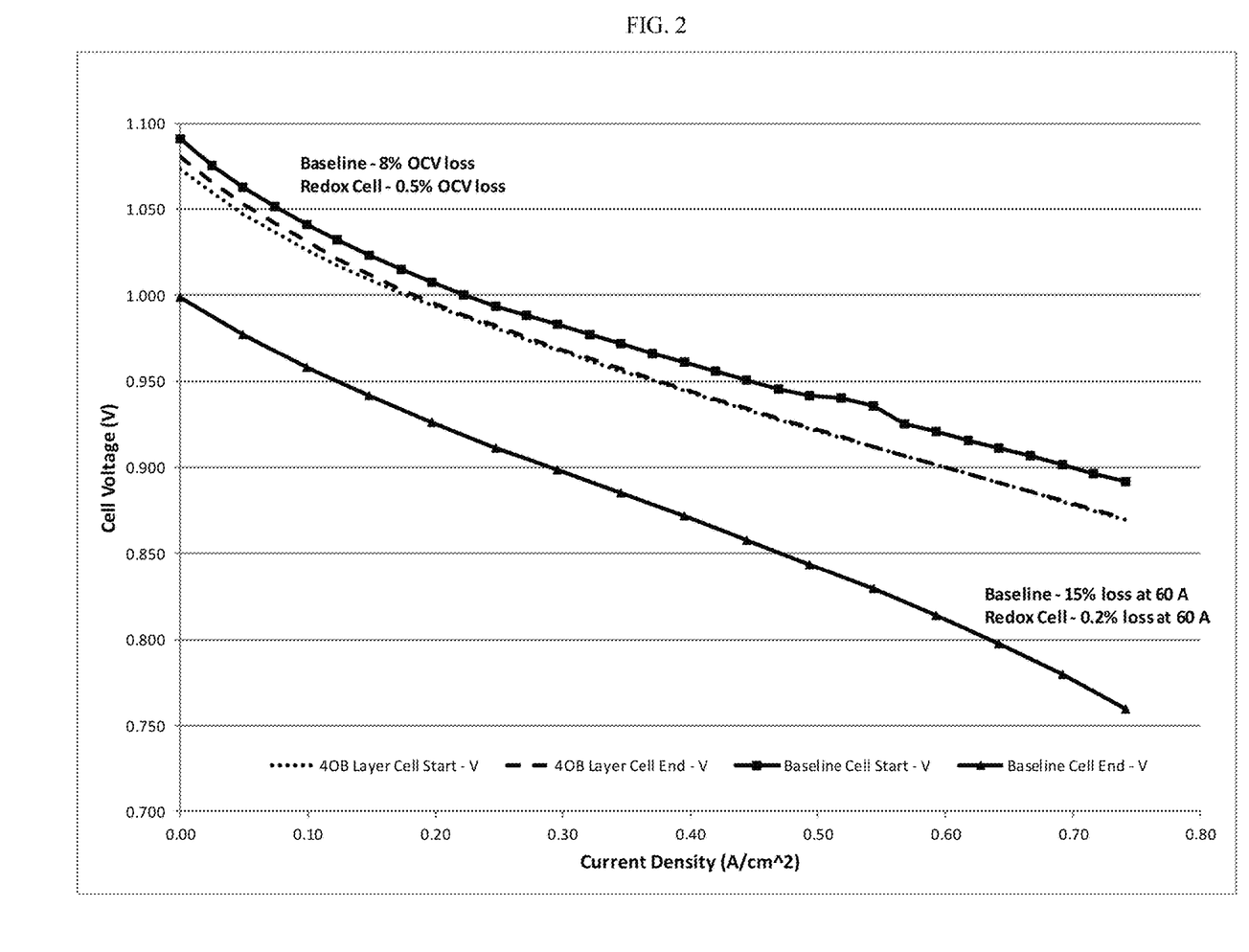
FIG. 2 plots the voltage (V) against current density (J) for a cell of the present technology as compared to a comparative cell when each are subjected to accelerated redox degradation testing, according to the working examples.

FIG. 2 plots the Voltage (V) against Current Density (J) for the two cells when subjected to accelerated redox degradation testing to illustrate the effects that occur due to loss of fuel (i.e., a redox event). FIG. 2 shows that the solid oxide cell of the present technology shows significantly lower performance loss after this accelerated redox degradation testing. The testing uses the amount of nickel within the cell and the flow rate of air to calculate the amount of time it would take to oxidize the cell to a specific redox depth (50% redox depth means that 50% of the nickel in the cell has been re-oxidized and 50% remains as metallic nickel; 100% redox depth represents a complete redox cycle back to a fully oxidized state). This approach assumes all the oxygen in the air feed to the test is used up to oxidize nickel, i.e., fast kinetics. This was confirmed to 60% oxidation depth previously by measuring the length of time taken before oxygen was detected in the outlet gas using gas chromatography. Redox cycles to an oxidation depth of 10%, 20%, 30%, 60%, 120% (excess air flow) and 180% (excess air flow) were performed for each cell using air flow rates of 120 ml min$^{-1}$ into the test jig, with times adjusted to accommodate the nickel content of each cell (to the nearest minute). The reason for the excess air is that as a full redox cycle (100% redox depth) is approached, not all the oxygen is used to oxidize nickel with the test arrangement utilized, so 120% is close to or represents a full redox cycle and 180% is a full redox cycle with almost double the oxygen required to oxidize all nickel in the cell supplied during the test. Baseline electrochemical testing was performed comparing initial current-voltage curves with tests after redox cycles to varying degrees of oxidation or redox depth and FIG. 2 shows a comparison for each cell described at the start and end of testing (i.e., the cumulative effects of all of the redox tests from 10-180%). Such testing is described in detail in Waldbillig D, Wood A, Ivey DG. Electrochemical and microstructural characterization of the redox tolerance of solid oxide fuel cell anodes. J Power Sources 2005; 145: 206-215, incorporated herein by reference.

Further accelerated redox testing was performed on solid oxide cells as illustrated in Table 2. Table 2 summarizes the degradation for the tested cells at open circuit voltage ("OCV"), high current density (60 Amps; "60A") and steady-state hold (40.5 Amps, "40.5A") conditions at higher fuel utilization. The composition of the initial components used to provide the OBL #2 and OBL #3 are provided in Table 3. As evidenced by these studies, solid oxide cells of the present technology surprisingly and significantly prevent degradation, with several approaching zero degradation (<0.5%).

TABLE 2

| | | OBL Composition (μm | Cell Voltage (mV) at | | | | | | Total Degradation | | |
|---|---|---|---|---|---|---|---|---|---|---|---|
| Test No. | Cell Type | thickness range) | Start (OCV) | End (OCV) | Start (60 A) | End (60 A) | Start (40.5 A) | End (40.5 A) | OCV | 60 A | 40.5 A |
| 101278 | TSC-2 | None (NA) | 1097 | 1053 | 836 | 746 | 816 | 742 | 4 | 11 | 9 |
| 102038 | TSC-2 | None (NA) | 1078 | 1046 | 775 | 690 | 795 | 710 | 3 | 11 | 11 |
| 102039 | TSC-3 | None (NA) | 1091 | 999 | 892 | 761 | 882 | 816 | 8 | 15 | 7 |
| 102048 | TSC-3 | None (NA) | 1089 | 1017 | 879 | 773 | 875 | <600 | 7 | 12 | 100 |
| 102050 | TSC-3 | None (NA) | 1091 | 981 | 884 | 755 | 881 | <600 | 10 | 15 | 100 |
| 102053 | TSC-3 + OBL | OBL #1 (5-8 μm) | 1082 | 1055 | 869 | 840 | 863 | 839 | 2 | 3 | 3 |
| 102056 | TSC-3 + OBL | OBL #1 (5-7 μm) | 1090 | 1061 | 870 | 858 | 863 | 858 | 3 | 1 | 1 |

TABLE 2-continued

| Test No. | Cell Type | OBL Composition (μm thickness range) | Cell Voltage (mV) at | | | | | | Total Degradation (%) | | |
|---|---|---|---|---|---|---|---|---|---|---|---|
| | | | Start (OCV) | End (OCV) | Start (60 A) | End (60 A) | Start (40.5 A) | End (40.5 A) | OCV | 60 A | 40.5 A |
| 102064 | TSC-3 + OBL | OBL #1 (5-7 μm) | 1082 | 1058 | 857 | 832 | 859 | 831 | 2 | 3 | 3 |
| 102072 | TSC-3 + OBL | OBL #1 (8-10 μm) | 1073 | 1068 | 870 | 868 | 865 | 865 | 0 | 0 | 0 |
| 102073 | TSC-3 + OBL | OBL #1 (7-10 μm) | 1084 | 1076 | 876 | 878 | 872 | 874 | 1 | 0 | 0 |
| 102076 | TSC-3 + OBL | OBL #1 (4-6 μm) | 1081 | 1081 | 871 | 878 | 871 | 876 | 0 | 0 | 0 |

TABLE 3

| Component | OBL #2 (mass %) | OBL #3 (mass %) |
|---|---|---|
| NiO | 51.48 | 32.15 |
| 8-YSZ | 42.84 | 33.47 |
| $Co_3O_4$ | — | 34.38 |
| $Fe_2O_3$ | 5.68 | — |

Figure 3:
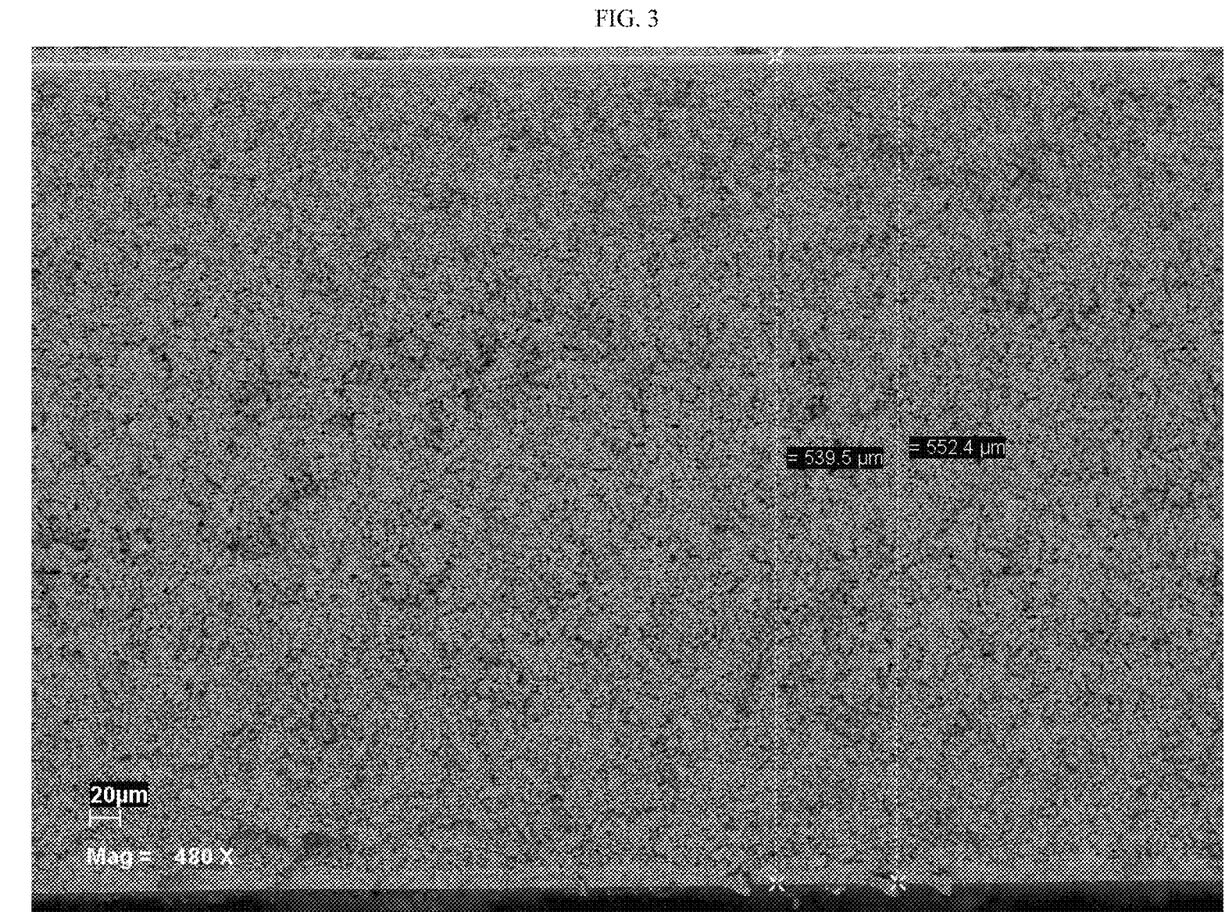
FIG. 3 provides a scanning electron microscopy (SEM) image showing the internal structure of a cell of the present technology, according to the working examples.
Figure 4:
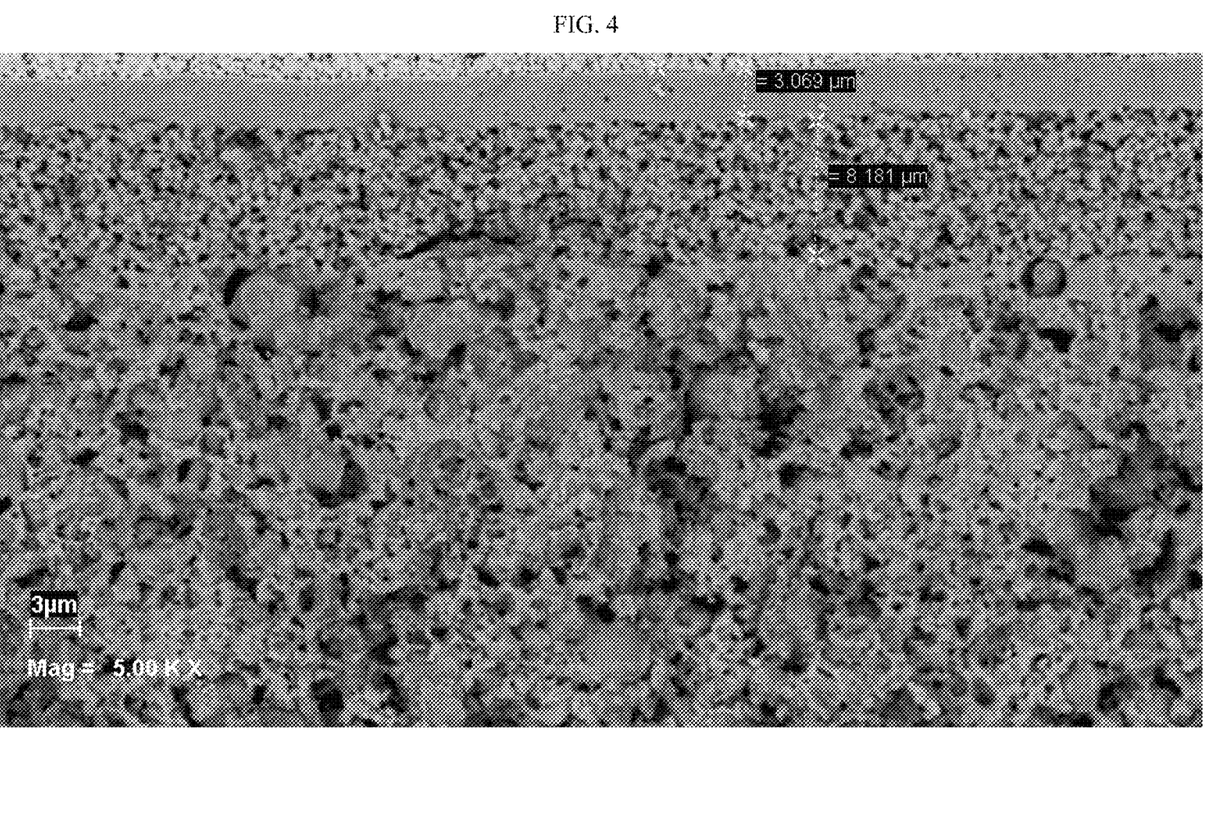
FIG. 4 provides an SEM image that is a close-up view of the cell illustrated in FIG. 3, according to the working examples.
Figure 5:
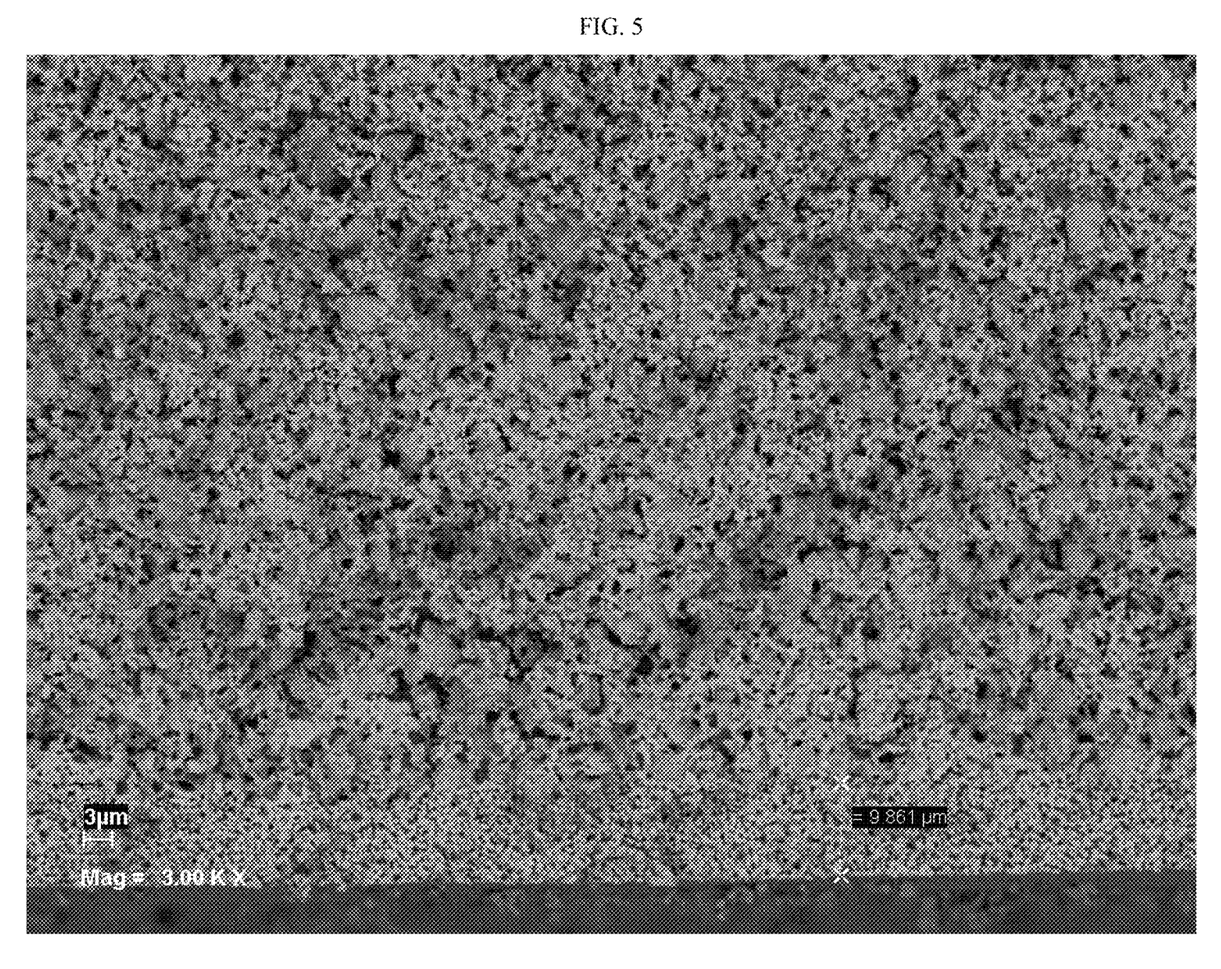
FIG. 5 provides an SEM image that is a different close-up view of the cell illustrated in FIG. 3, according to the working examples.

The cell used in Test No. 102072 was further imaged by scanning electron microscopy (SEM) to illustrate the cell microstructure, including showing each of the cell layers. This cell was imaged as a fracture surface subsequent to the accelerated redox testing and is in the reduced (operational) state. FIG. 3 shows the porous solid cathode layer at the top of the image, followed by a dense YSZ layer (the solid electrolyte layer), a fine microstructured porous Ni-YSZ AFL, a relatively thick layer of coarse microstructured and higher porosity Ni-YSZ anode support, and the bottom layer of fine-microstructured Ni-Co—YSZ OBL. FIG. 4 shows (from top to bottom of image) a close-up of the top of this solid oxide cell showing the porous solid cathode layer, solid electrolyte layer, and AFL in more detail along with a small portion of the AS. FIG. 5 shows a close-up of the bottom of the solid oxide cell used in Test No. 102072, showing a portion of the coarse microstructured AS (top of image) with the entire thickness of the fine microstructured OBL including a thickness label.

The present technology is not to be limited in terms of the particular figures and examples described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, reagents, compounds, compositions, or labeled compounds, which can, of course, vary. It is also to be understood that the terminology used herein is for the purpose of describing particular aspects only, and is not intended to be limiting.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A solid oxide cell comprising:
   a porous solid cathode layer including a first cathode surface, and a second cathode surface;
   a solid electrolyte layer comprising a first electrolyte surface disposed toward the second cathode surface, and a second electrolyte surface;
   a porous cermet anode functional layer (AFL) comprising a first AFL surface contacting the second electrolyte surface, and a second AFL surface;

a porous cermet anode substrate (AS) comprising a first AS surface contacting the second AFL surface and a second AS surface; and a porous cermet oxidation barrier layer (OBL) comprising a first OBL surface contacting the second AS surface, and a second OBL surface;

wherein the OBL comprises yttria-stabilized zirconia and about 35 vol. % to about 70 vol. % of transition metals selected from nickel and one or both of cobalt and iron.

B. The solid oxide cell of Paragraph A, wherein a ratio of nickel to cobalt and iron in the OBL is from about 1:5 to about 15:1.

C. The solid oxide cell of Paragraph A and Paragraph B, wherein the OBL has an average thickness of about 1 μm to about 50 μm.

D. The solid oxide cell of any one of Paragraphs A-C, wherein the OBL comprises about 65 vol. % to about 30 vol. % yttria-stabilized zirconia.

E. The solid oxide cell of any one of Paragraphs A-D, wherein the OBL does not comprise copper.

F. The solid oxide cell of any one of Paragraphs A-E, wherein the OBL does not comprise manganese.

G. The solid oxide cell of any one of Paragraphs A-F, wherein the OBL does not comprise silver.

H. The solid oxide cell of any one of Paragraphs A-G, wherein the OBL does not comprise palladium.

I. The solid oxide cell of any one of Paragraphs A-H, wherein the OBL does not comprise transition metals other than nickel and one or both of cobalt and iron.

J. The solid oxide cell of any one of Paragraphs A-I, wherein the OBL comprises particles with a number-average diameter of about 0.1 μm to about 1.5 μm.

K. The solid oxide cell of any one of Paragraphs A-J, wherein the OBL has a porosity of about 5% to about 50%.

L. The solid oxide cell of any one of Paragraphs A-K, wherein the solid oxide cell further comprises a porous cathode barrier layer (CBL) disposed between the cathode second surface and the first electrolyte surface.

M. The solid oxide cell of Paragraph L, wherein the CBL comprises ceria.

N. The solid oxide cell of Paragraph L or Paragraph M, wherein the CBL comprises doped ceria.

O. The solid oxide cell of any one of Paragraphs L-N, wherein the CBL has an average thickness of about 1 μm to about 10 μm.

P. The solid oxide cell of any one of Paragraphs A-O, wherein the porous solid cathode layer comprises lanthanum strontium manganese (LSM), lanthanum strontium cobalt (LSC), lanthanum strontium cobalt ferrite (LSCF), strontium samarium cobaltite (SSC), barium strontium cobalt iron oxide (BSCF), or a combination of any two or more thereof.

Q. The solid oxide cell of any one of Paragraphs A-P, wherein the AFL comprises yttria-stabilized zirconia and about 35 vol. % to about 70 vol. % of transition metals provided that the AFL does not comprise both cobalt and iron.

R. The solid oxide cell of any one of Paragraphs A-Q, wherein the porous solid cathode layer is from about 5 μm to about 50 μm thick.

S. The solid oxide cell of any one of Paragraphs A-R, wherein the porous solid cathode layer has a porosity (when oxidized) of about 5% to about 50%.

T. The solid oxide cell of any one of Paragraphs A-S, wherein the solid electrolyte layer is from about 1 μm to about 20 μm thick.

U. The solid oxide cell of any one of Paragraphs A-T, wherein the solid electrolyte layer comprises a yttria-stabilized zirconia, a scandia-stabilized zirconia (ScSZ), a Gd-doped ceria, a Sm-doped ceria, a strontium and magnesium doped lanthanum gallate (LSGM; e.g., $La_{1-x}Sr_xGa_{1-y}Mg_yO_{3-\delta}$), or a combination of any two or more thereof.

V. The solid oxide cell of any one of Paragraphs A-U, wherein the AFL is from about 5 μm to about 25 μm thick.

W. The solid oxide cell of any one of Paragraphs A-V, wherein the AFL has a porosity (when reduced) of about 10% to about 50%.

X. The solid oxide cell of any one of Paragraphs A-W, wherein the AS is from about 200 μm to about 1.5 mm thick.

Y. Y. The solid oxide cell of any one of Paragraphs A-X, wherein the AS has a porosity (when reduced) from about 25% to about 60.

Other embodiments are set forth in the following claims, along with the full scope of equivalents to which such claims are entitled.

What is claimed is:

1. A solid oxide cell comprising:
   a porous solid cathode layer including a first cathode surface and a second cathode surface;
   a solid electrolyte layer comprising a first electrolyte surface and a second electrolyte surface, with the first electrolyte surface disposed toward the second cathode surface;
   a porous cermet anode functional layer (AFL) comprising a first AFL surface and a second AFL surface, the first AFL surface contacting the second electrolyte surface;
   a porous cermet anode substrate (AS) comprising a first AS surface and a second AS surface, the first AS surface contacting the second AFL surface; and
   a porous cermet oxidation barrier layer (OBL) comprising a first OBL surface and a second OBL surface, the first OBL surface contacting the second AS surface;
   wherein the porous solid cathode layer has a porosity when oxidized in a range of about 5% to about 50%;
   wherein the AFL comprises yttria-stabilized zirconia and about 35 vol. % to about 70 vol. % of transition metals provided that the AFL does not comprise both cobalt and iron;
   wherein the AFL has a porosity when reduced in a range of about 10% to about 50%;
   wherein the AS has a porosity when reduced in a range of about 25% to about 60%;
   wherein the OBL comprises yttria-stabilized zirconia and about 35 vol. % to about 70 vol. % of transition metals including (i) nickel, and (ii) at least one of cobalt or iron;
   wherein the thickness of the OBL is in a range of about 1 μm to about 30 μm;
   wherein, in the OBL, a ratio of (i) said nickel to (ii) said at least one of cobalt or iron is in a range of about 1:5 to about 10:1; and
   wherein the OBL has a porosity when reduced in a range of about 5% to about 50%.

2. The solid oxide cell of claim 1, wherein, in the OBL, the ratio of (i) said nickel to (ii) said at least one of cobalt or iron is in a range of about 8:1 to about 10:1.

3. The solid oxide cell of claim 1, wherein the thickness of the OBL is in a range of about 1 μm to about 10 μm.

4. The solid oxide cell of claim 1, wherein the porous solid cathode layer comprises a material selected from the group consisting of lanthanum strontium manganese (LSM), lanthanum strontium cobalt (LSC), lanthanum strontium cobalt ferrite (LSCF), strontium samarium cobaltite (SSC), barium strontium cobalt iron oxide (BSCF), and a combination of any two or more thereof.

5. The solid oxide cell of claim 4, wherein the porous solid cathode layer has a thickness in a range of about 5 μm to about 50 μm.

6. The solid oxide cell of claim 1, wherein the solid electrolyte layer comprises a material selected from the group consisting of yttria-stabilized zirconia, a scandia-stabilized zirconia (ScSZ), a Gd-doped ceria, a Sm-doped ceria, a strontium and magnesium doped lanthanum gallate (LSGM) and a combination of any two or more thereof.

7. The solid oxide cell of claim 6, wherein the solid electrolyte layer has a thickness in a range of about 1 μm to about 20 μm.

8. The solid oxide cell of claim 1, wherein the AFL has a thickness in a range of about 5 μm to about 25 μm.

9. The solid oxide cell of claim 1, wherein the AS has a thickness in a range of about 200 μm to about 1.5 mm.

10. The solid oxide cell of claim 1, wherein the OBL has a porosity when oxidized in a range of 1% to 10%.

11. The solid oxide cell of claim 1, wherein the OBL is configured to have a first porosity when reduced and a second porosity when oxidized, the first porosity greater than the second porosity.

12. The solid oxide cell of claim 1, wherein the solid oxide cell further comprises a porous cathode barrier layer (CBL) comprising ceria or doped ceria, the CBL disposed between the second cathode surface and the first electrolyte surface.

13. The solid oxide cell of claim 12, wherein the CBL has a thickness is in a range of about 1 μm to about 10 μm.

* * * * *